United States Patent [19]

Raff et al.

[11] Patent Number: 5,044,220
[45] Date of Patent: Sep. 3, 1991

[54] SHIFTING ARRANGEMENT FOR AN AUTOMATIC TRANSMISSION OF A MOTOR VEHICLE

[75] Inventors: Friedrich Raff, Eberdingen; Ulrich Maier, Freiberg/N., both of Fed. Rep. of Germany

[73] Assignee: Dr. Ing. h.c.F. Porsche AG, Fed. Rep. of Germany

[21] Appl. No.: 562,930

[22] Filed: Aug. 6, 1990

Related U.S. Application Data

[63] Continuation-in-part of Ser. No. 302,387, Jan. 27, 1989, Pat. No. 4,987,792.

[30] Foreign Application Priority Data

Mar. 10, 1988 [DE] Fed. Rep. of Germany ....... 3807881
Aug. 18, 1989 [DE] Fed. Rep. of Germany ....... 3927250

[51] Int. Cl.$^5$ ............................................. B60K 20/04
[52] U.S. Cl. .................................. 74/473 R; 74/335; 74/473 P; 74/477
[58] Field of Search ................. 74/335, 473 R, 473 P, 74/477

[56] References Cited

U.S. PATENT DOCUMENTS

| | | | |
|---|---|---|---|
| 4,472,730 | 4/1984 | Snoy | 74/473 P X |
| 4,519,266 | 5/1985 | Reinecke | 74/473 R X |
| 4,541,300 | 9/1985 | Kwiatkowski et al. | 74/473 R X |
| 4,630,499 | 12/1986 | Hopkins | 74/473 R |
| 4,660,443 | 4/1987 | Simancik | 74/473 R X |
| 4,798,099 | 1/1989 | Alexander et al. | 74/473 R |

FOREIGN PATENT DOCUMENTS

| | | |
|---|---|---|
| 206292 | 11/1959 | Austria . |
| 2136792 | 2/1973 | Fed. Rep. of Germany . |
| 3410938 | 10/1984 | Fed. Rep. of Germany . |
| 3717675 | 12/1988 | Fed. Rep. of Germany . |
| 3807881 | 9/1989 | Fed. Rep. of Germany . |

*Primary Examiner*—Allan D. Hermann
*Assistant Examiner*—David W. Laub
*Attorney, Agent, or Firm*—Evenson, Wands, Edwards, Lenahan & McKeown

[57] ABSTRACT

A shifting arrangement of an automatic transmision of a motor vehicle has a selector lever which can be pivoted in two shifting paths. In the first shifting path of the selector lever, various operating positions and automatically shifting gears of the transmission may be selected via a transmitting device. The selector lever can be changed over into a second shifting path in which, by a one-time pivoting of the selector lever from a center position, an upshifting or return shifting may take place by one gear respectively. A locking device interacts with the transmitting device so that the transmitting device, from which the selector lever is separated in the second shifting path, is held in its intended position.

11 Claims, 2 Drawing Sheets

SHIFTING ARRANGEMENT FOR AN AUTOMATIC TRANSMISSION OF A MOTOR VEHICLE

This application is a Continuation-in-Part of pending U.S. patent application, Ser. No. 07/302,387, filed on Jan. 27, 1989, claiming priority of German Application P 38 07 881.3, filed in Germany on Mar. 10, 1988. This Application is also related to U.S. patent application Ser. No. 7/567,788, filed on Aug. 15, 1990, based on German Application P 39 27 248.6, filed in Germany on Aug. 18, 1989 now U.S. Pat. No. 4,987,792.

The present invention relates to a shifting arrangement for an automatic transmission of a motor vehicle which is influenced by an electronic control unit and has a selector lever that is pivotable in a first shifting path to select several operating positions and automatically shifting transmission gears, and is movable via a transverse path into a second shifting path parallel with respect to the first shifting path. The pivoting of the selector lever in a first direction from a neutral center position in the second shifting path actuates a first sensor to cause an upshifting by one gear and a pivoting in a second direction from the neutral center position actuates a second sensor to cause a downshifting by one gear, with the selector lever returning to the neutral center position after a shifting operation in the second shifting path.

In a shifting arrangement described in German Patent Document DE-A 38 07 881, upon which the above-mentioned parent application is based, the selector lever, as is appropriate for its operation, can be adjusted from a first shifting path into a second shifting path and vice versa. When the selector lever is in the first shifting path, it interacts with a transmitting device which comprises an actuating lever that mechanically transmits the operating positions and automatically shifts gears of the transmission. This actuating lever extends outside a housing of the shifting arrangement and is aligned in the direction of the road. When the selector lever is changed over into the second shifting path, it is separated from the transmitting device and the actuating lever is not secured against an undesirable displacement, for example, out of the D-position.

It is one of the objects of the invention to take such measures at the shifting arrangement in the area of the transmitting device so that the transmitting arrangement always interacts securely with the selector lever.

This and other objects are achieved by the present invention which provides a shifting arrangement for an automatic transmission of a motor vehicle which is influenced by an electronic control unit comprising a selector lever pivotable in a first shifting path to select several operating positions and automatically shifting transmission gears. The selector lever is movable via a transverse path into a second shifting path parallel with respect to the first shifting path, a pivoting of the selector lever in a first direction from a neutral center position in the second shifting path causing an upshifting by one gear and a pivoting in a second direction from the neutral center position causing a downshifting by one gear. A transmitting device is coupled to the selector lever in the first shifting path to transmit movements of the selector lever to shift the operating positions and automatically shift gears. This transmitting device includes a driving dog that interacts with the selector lever. A shaft extends transversely with respect to a longitudinal direction of the motor vehicle, and the selector lever and the driving dog are rotatably disposed on this shaft. A locking device interacts with the transmitting device to lock the transmitting device when the selector lever is in the second shifting path.

One of the principal advantages achieved by the present invention is that the locking device secures the transmitting device when the selector lever is changed over into the second shifting path. As a result, it is reliably avoided that the transmitting device, in an undesirable manner, is displaced from its intended position, for example, as a result of vehicle vibrations or because of driving resistances of the road which affect the actuating lever arranged outside the shifting arrangement. The locking device, specifically its locking element, is a component which can easily be arranged at the driving dog without requiring a separate space. This also applies to the stationary component into which the locking element engages as a function of the shifting path position of the selector lever.

Other objects, advantages and novel features of the present invention will become apparent from the following detailed description of the invention when considered in conjunction with the accompanying drawings.

DETAILED DESCRIPTION OF THE DRAWINGS

An automatic transmission for a motor vehicle, which can be controlled by an electronic control unit, can be influenced by a shifting arrangement. The control unit, the automatic transmission and the motor vehicle are not shown in detail; reference is made for this purpose to the parent application of this application and to German Patent Document P 38 07 881.3 on which the parent application is based.

Figure 1:
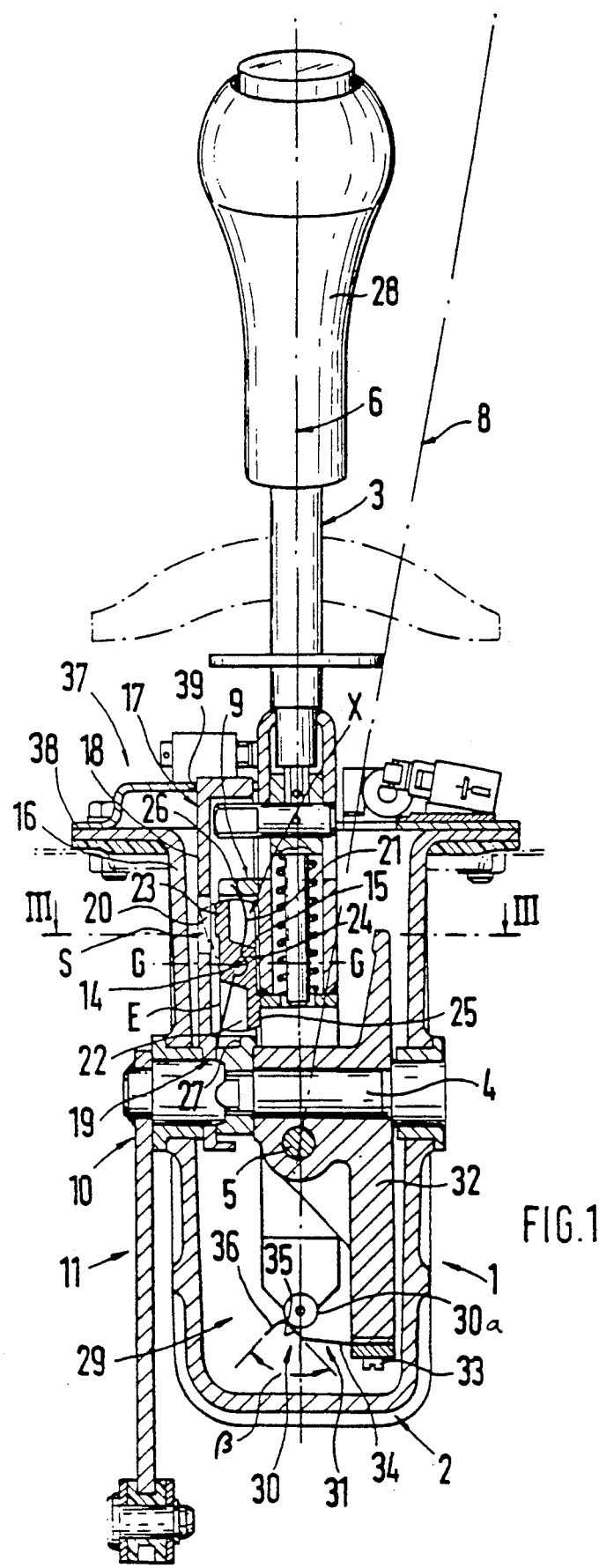
FIG. 1 is a cross-sectional view of a shifting arrangement constructed according to an embodiment of the present invention having a selector lever which can be pivoted in two shifting paths.
Figure 2:
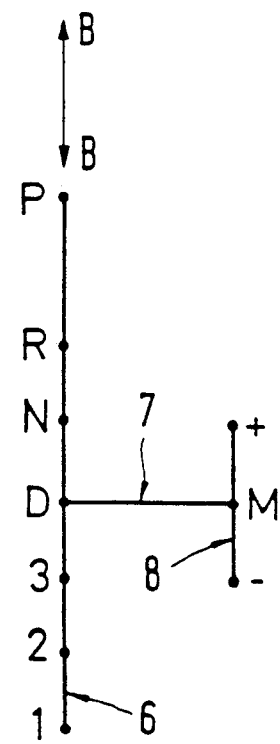
FIG. 2 is a shifting diagram of the selector lever of FIG. 1.

The shifting arrangement 1 comprises a container-type housing 2 which has a U-shaped cross-section and is made of plastic, cast light metal or the like. In the housing 2 a selector lever 3 is disposed on a shaft 4 extending transversely to the longitudinal direction B—B of the vehicle and also on a shaft 5 aligned in the longitudinal direction B—B of the vehicle. By means of this cardanic mounting, the selector lever 3 can be pivoted in a first shifting path 6 in the longitudinal direction B—B of the vehicle in which different positions, such as P= Parking; R=Reverse; N=Neutral-0; D=Drive in the 4th gear; 3=3rd gear; 2=2nd gear; 1=1st gear of the automatic transmission can be selected. However, the selector lever 3 can also be changed over from Position D of the first shifting path 6, by way of a transverse path 7, into a second shifting path 8. The first shifting path 6 and the second shifting path 8 extend in parallel with respect to one another (FIG. 2), forming a double T with the transverse path 7.

After the selector lever 3 is introduced into the second shifting path 8, it can also be pivoted in the longitudinal direction B—B of the vehicle. In this case, an upshifting by one gear respectively is caused by a one-time pivoting of the selector lever 3 from a center position M into the plus direction (+) (i.e. step-by-step shifting). The return shifting, also by one gear respectively, takes place by the pivoting of the lever in the minus direction (−). The selector lever 3 is automatically placed back in its neutral M position after each shifting operation in the plus or minus direction.

In the first shifting path 6, the selector lever 3 interacts with a driving dog 9 of a transmitting device 10 which mechanically shifts the operating positions and automatic positions of the transmission via an actuating lever 11 extending outside the housing 2 and aligned toward the road. The driving dog 9 and the selector lever 3 are rotatably disposed on the shaft 4, the driving dog 9 surrounding the selector lever 3 in a form-locking manner in the first shifting path 6 by means of a fork-type section 12, while the selector lever 3 and the transmitting device 10 are operatively connected.

Figure 3:
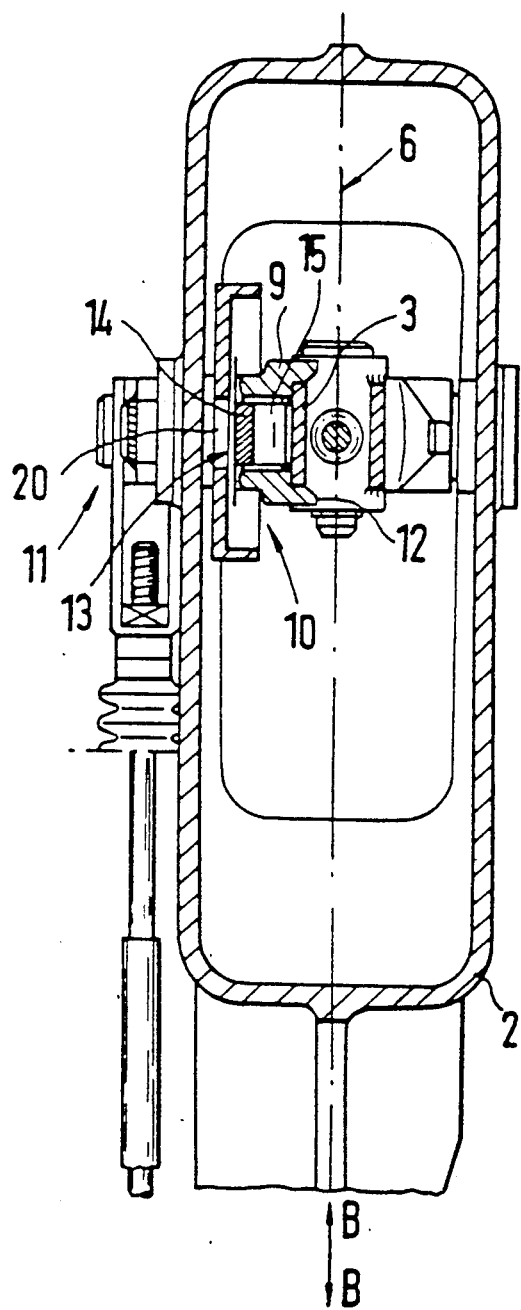
FIG. 3 is a sectional view according to Line III—III of FIG. 1.

When the selector lever 3, via the shaft 4, is pivoted into the second shifting path 8, it is separated from the driving dog 9 and a locking device 13 (FIG. 3) becomes operative by securing the transmitting device 10 against relative movements on the shaft 4. The locking device 13 comprises a locking element 15 which is rotatably disposed at the driving dog 9 by a horizontal pin 14 which is aligned in the longitudinal direction B—B of the vehicle, the driving dog 9 extending perpendicularly with respect to the shaft 4. A stationary component 17 having a plate 18 extends between an upright wall 16 of the housing 2 and the driving dog 9, the plate 18 being aligned perpendicularly with respect to the shaft 4, and surrounding the shaft by a bore 19. The plate 18 has an opening 20 that is arranged opposite the locking element 15 which, as a function of the shifting path position 6 or 8 of the selector lever 3 and under the effect of a spring 21, can be pivoted from an unlocked position E into a locked position S. In the locked position S, the locking element 15 engages in the opening 20 of the plate 18.

Figure 4:
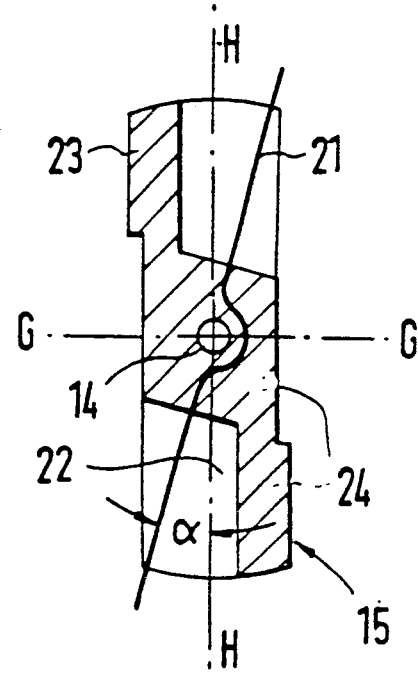
FIG. 4 is an enlarged detail of the area X of FIG. 1.

On both sides of a transverse center plane G—G which intersects the pin 14, the locking element 15 has latches 22, 23 which, in a mirror-inverted manner, lead away from a thickening 24 surrounding the pin 14. The upper latch 23 interacts with the opening 20, while the lower latch 22 interacts with a section 25 of the selector lever 3. The spring 21 is a leaf spring which penetrates the thickening 24 while by-passing the pin 14. The spring 21 is aligned in the longitudinal direction of the latches 22, 23 and, in the unlocked position E of the locking element 24, supports itself under prestress at an upper supporting ramp 26 of the driving dog 9. In the locked position S, the spring 21, with slight prestress, interacts with the supporting ramp 26 as well as with another supporting ramp 27. In FIG. 4, the locking element 15 is shown as a prefabricated component together with the spring 21. Accordingly, the spring 21 projects beyond the latch 22, 23 and is arranged obliquely—angle α—with respect to the longitudinal direction H—H of these latches. In the unlocked position E, this arrangement causes the defined prestressing of the spring 21.

On the end 29 of the selector lever 3 furthest away from a grip 28, a spring detent arrangement 30 is provided which fixes the selector lever 3 in its positions in the shifting paths 6 and 8. The spring detent arrangement 30 is formed by a roller 30a at the selector lever 3 and a leaf spring 31 at a component 32 which is fixed with respect to the selector lever 3. The leaf spring 31 is held at component 32 by a screw 33 and has a spring section 34, at the free end of which, bendings 35, 36 are provided which extend at an angle β with respect to one another. In shifting path 6, the roller 30 rests against bending 35, while in shifting path 8, it rests against bending 36. Reference number 37 indicates a cover 38 of the housing 2 which has an opening 39 into which component 17 projects and is fixed in this manner.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A shifting arrangement for an automatic transmission of a motor vehicle which is influenced by an electronic control unit, comprising:

a selector lever pivotable in a first shifting path to select several operating positions and automatically shifting transmission gears, movable via a transverse path into a second shifting path parallel with respect to the first shifting path, a pivoting of the selector lever in a first direction from a neutral center position in the second shifting path causing an upshifting by one gear and a pivoting in a second direction from the neutral center position causing a downshifting by one gear;

a transmitting device coupled to the selector lever in the first shifting path to transmit movements of the selector lever to shift the operating positions and automatically shift gears, said transmitting device including a driving dog that interacts with the selector lever;

a shaft extending transversely with respect to a longitudinal direction of the motor vehicle, said selector lever and said driving dog being rotatably disposed on said shaft;

a locking device that interacts with the transmitting device to lock the transmitting device when the selector lever is in the second shifting path.

2. The shifting arrangement according to claim 1, further comprising a spring and wherein the locking device includes a locking element and a pin, said locking element being rotatably arranged via said pin at said driving dog, said locking element being pivotable from an unlocked position into a locked position under the effect of said spring and as a function of the shifting path position of the selector lever.

3. The shifting arrangement according to claim 2, further comprising a stationary component having a plate with an opening, said locking element engaging in said opening when said locking element is in the locked position.

4. The shifting arrangement according to claim 3, wherein the plate extends perpendicularly with respect to the shaft and includes a bore that surrounds said shaft.

5. The shifting arrangement according to claim 4, wherein the shifting arrangement includes a housing with an upright wall, the plate extending adjacent to said upright wall.

6. The shifting arrangement according to claim 2, wherein the locking member, on both sides of a transverse center plane intersecting the pin, has latches extending away from a thickening which are arranged in a mirror-inverted manner.

7. The shifting arrangement according to claim 6, wherein the shifting arrangement includes an opening and the upper latch interacts with said opening and the lower latch interacts with the selector lever.

8. The shifting arrangement according to claim 6, wherein the driving dog has supporting ramps and the spring is a leaf spring which, penetrating the thickening, extends in a longitudinal direction of the latches and interacts with the supporting ramps.

9. The shifting arrangement according to claim 8, wherein the leaf spring extends around the pin.

10. The shifting arrangement according to claim 1, wherein the driving dog includes a fork-type section that surrounds the selector lever.

11. The shifting arrangement according to claim 1, further comprising at an end opposite a free side grip of the selector lever, a spring detent arrangement that fixes the position of the selector lever in the first shifting path and in the second shifting path.

* * * * *